Aug. 12, 1969    S. A. DOLIN    3,460,892
RAPID SCAN SPECTROMETER THAT SWEEPS CORNER MIRRORS THROUGH THE SPECTRUM
Filed May 27, 1966
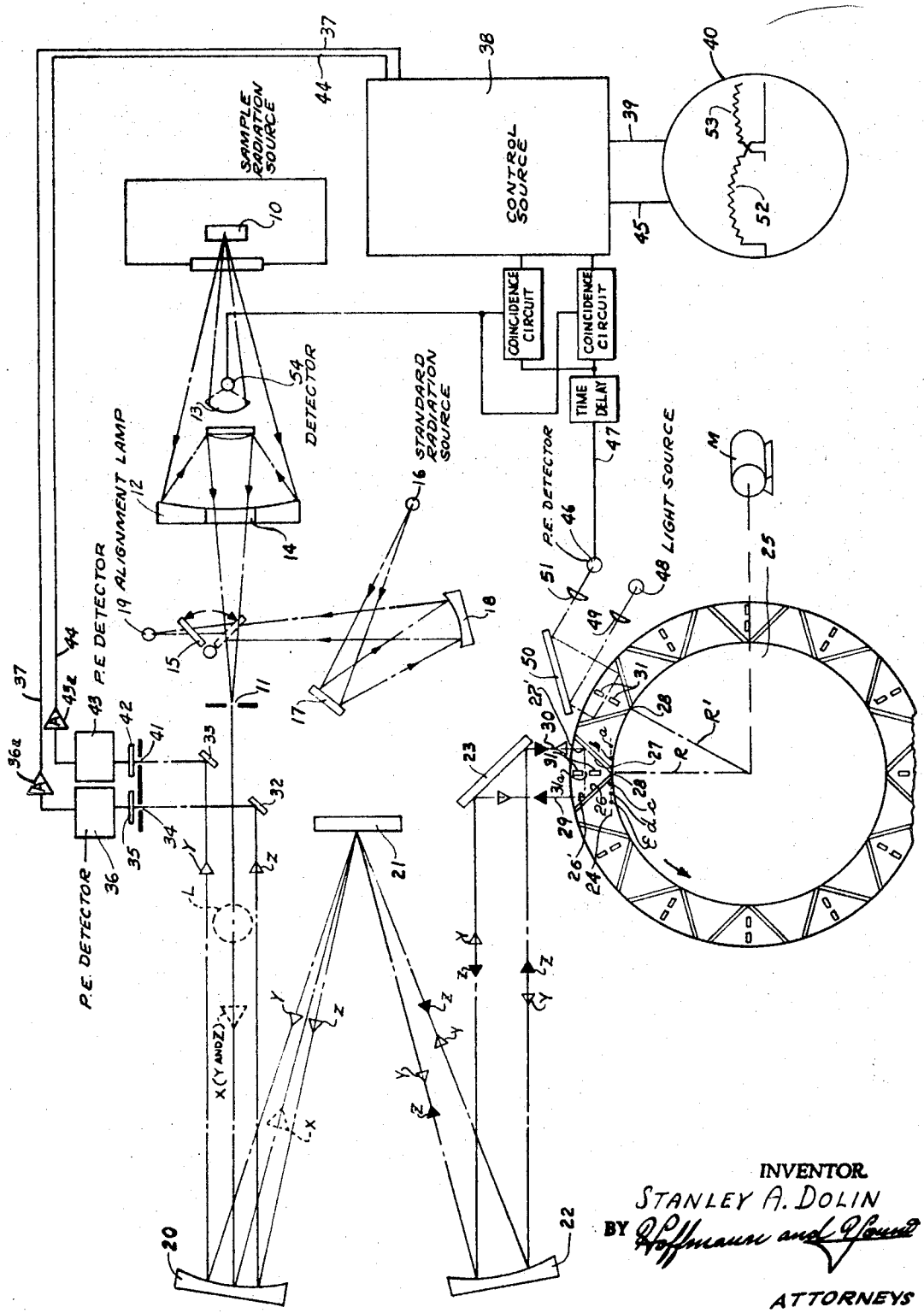
INVENTOR.
STANLEY A. DOLIN
BY Hoffmann and Isaud
ATTORNEYS

United States Patent Office 3,460,892
Patented Aug. 12, 1969

3,460,892
RAPID SCAN SPECTROMETER THAT SWEEPS CORNER MIRRORS THROUGH THE SPECTRUM
Stanley A. Dolin, Flushing, N.Y., assignor to The Warner & Swasey Company, Cleveland, Ohio, a corporation of Ohio
Filed May 27, 1966, Ser. No. 553,405
Int. Cl. G01j 3/42
U.S. Cl. 356—83                                  10 Claims

ABSTRACT OF THE DISCLOSURE

Spectral analysis instrument having corner mirrors on a rotary scanning wheel, with an apertured baffle between the mirror members which make up each corner mirror. Radiant energy is focused by a Cassegrainian optical system on the entrance slit of a grating monochromator and is dispersed into a spectrum through which the corner mirrors scan in succession. The radiant energy reflected by the corner mirrors returns through the monochromator to a pair of exit slits, which are respectively for longer and shorter wavelength portions of the spectrum scanned. A cathode ray tube display of the scanned spectrum is synchronized with the rotation of the scanning wheel. For adjusting the instrument, a light source conjugate with the sample radiant energy source projects an image back through the Cassegrainian optical system.

---

This invention relates to a spectral analysis instrument for scanning transient radiation over a selected wavelength spectrum, particularly the infra-red visible and ultraviolet regions.

In the conventional spectrograph a photographic plate is placed in the focal plane, and the plate records the intensities of the radiation at different wavelengths within the range of the instrument. The use of a photographic plate is undesirable for two reasons: first, the wavelength range of photographic plates is limited to wavelengths shorter than about one micron; and second, the plate must be processed before the information is obtained, entailing delay and substantial error. The conventional way to eliminate the photographic plate is to put an exit slit in the focal plane, thus permitting radiation of only one wavelength at a time to leave the instrument. When used in this manner, the instrument is referred to as a monochromator.

If a photocell is placed behind the exit slit and the angle of the diffraction grating in the spectrograph is changed, the wavelength of radiation received by the photocell changes accordingly, and one obtains a spectrum consisting of the variation in intensity detected by the photocell as a function of the wavelength of radiation passed by the exit slit. In order to obtain a rapid scan of the spectrum by this means, the grating angle must be shifted rapidly, and, when a scan is completed, the grating angle must be restored to its original value before the next scan. This entails an oscillatory motion of the grating, actuated by a cam or similar means. This has the following disadvantages: the speed is limited since the grating cannot stand much acceleration; the scan is non-linear in time; and the critical optical alignment is upset if high speed it attempted.

The present invention is directed to an apparatus which overcomes the foregoing difficulties by providing a novel spectral scanning arrangement which does not involve moving the grating or any of the other critical optical components of the spectrograph itself and which produces a scan that is substantially linear with time and may be performed repetitively at high speed.

In the present invention, radiation to be analyzed is collected into an incoming beam which is dispersed into component spectral beams which are spaced apart in accordance with essentially a straight-line function of wavelength and are focused in a focal plane and scanned by a corner mirror or corresponding scanning device which sequentially, in accordance with a linear time function, returns the spectral beams along a predetermined return path through the instrument, which path is offset from the path of the incoming beam, to monochromatic exit slit means. In the preferred structure, a simultaneous scan of two bands of spectrum occurs and radiation is returned along two offset paths, one for each band, and the exit slit means comprises a pair of exit slits, one for each path. The scanning wheel preferably has a plurality of sets of corner mirrors with apertured baffle means along the mid-plane of each corner set to improve the response of the instrument. In accordance with a further aspect of the invention, the corner mirrors or other scanning elements are used optically to produce signal to indicate the start of a scan to thereby minimize the criticality in the mounting of the mirrors. Preferably, the instrument further includes an internal imaging means for aligning the instrument and the source to be analyzed.

The present invention will be better understood from the following detailed description of a presently-preferred embodiment thereof, which is illustrated schematically in the single figure of the accompanying drawing.

Referring to the drawing, the spectral analysis instrument illustrated there includes a Cassegrainian optical system for collecting infra-red radiant energy emitted by a radiation source 10 and for imaging the collected energy on the entrance slit 11 of a grating monochromator. The Cassegrainian collector includes a primary condenser mirror 12 presenting a spherical reflecting surface which is concave toward the sample radiation source 10 and a secondary condenser mirror 13 disposed between the sample and the primary mirror to receive the radiant energy reflected from the primary mirror. The secondary mirror presents a spherical reflecting surface which is convex toward the primary mirror. After reflection by the primary mirror, the radiant energy is reflected by the secondary mirror 13 through a central opening 14 in the primary mirror and is focused on the entrance slit 11. Focusing is accomplished by moving the primary mirror 12.

The radiation source 10 may be, for example, an infra-red radiation source which directs energy through a zone in which a solid propellant is burned so that the radiation to the instrument is the radiation from the source as modified by absorption or addition of energy from the vaporized sample. Radiation directly from the source may also be applied to the mirror 12 in a known manner alternatively with that from the vaporized zone to provide reference radiation.

For calibration purposes a double plane mirror 15, having both of its opposite major faces aluminized, is pivotally supported between the primary mirror 12 and the entrance slit 11 of the grating monochromator. In its full line position in the figure, this mirror 15 permits the radiant energy from the source 10 to be imaged on the entrance slit, as described. When the mirror is moved to its phantom line position in the figure, one face of mirror 15 images the radiant energy from a standard source 16 on the entrance slit 11. The radiant energy from this standard source is reflected by a plane mirror 17 on the concave surface of a mirror 18 and from there to mirror 15. The radiation energy from the standard source may be held constant by using a radiation sensor as part of a controlled loop servo system, or by any other suitable control arrangement (not shown).

In this phantom line position of mirror 15, its opposite major face reflects light from an alignment lamp 19, which is optically conjugate to the entrance slit 11, back through the Cassegrainian optical system for alignment purposes. A visible image of the alignment lamp 19 is obtained in the focal plane of the sample area with no parallax error. If desired, this alignment lamp may be omitted or it may be replaced by a removable ground glass lamp L placed behind the slit 11 to illuminate the full f number of the optical system and thus project an image into space at the radiation source 10.

The radiant energy from the sample radiation source 10, after passing through the entrance slit 11 of the grating monochromator is a diverging beam which is collimated by a first collimator mirror 20, which presents a reflecting surface that is concave to the incoming radiant energy. The radiant energy reflected by the collimating mirror 20 is comprised of substantially parallel rays which strike a light-dispersing element, preferably a diffraction grating 21, which disperses the radiation into a spectrum of component wavelengths.

The diffracted radiant energy is made up of collimated beams of monochromatic energy and the beams define different angles with the grating depending on wavelength to form a diverging bundle of beams which strikes a second collimator mirror 22, which presents a concave surface to the diffracted radiant energy. The diffracted radiant energy is reflected by mirror 22 to provide beams of converging radiation with the centerlines of the beams of different spectral components parallel and spaced apart perpendicular to its path in accordance with essentially a straight-line function of wavelength.

A plane mirror 23 presents a reflecting surface disposed at 45° to the path of the bundle of beams from the mirror 22 and folds these beams toward a focal plane for the converging beams designated by the line 24 in the figure. The different spectral components of the refracted radiant energy will have a focus along this focal plane at different locations indicated by the letters a, b, c, d, etc. For example, the shortest wavelength component appears at the right of this plane and the progressively longer wavelengths at positions successively to the left as viewed in the drawing.

In accordance with the present invention, a rotatable scanning wheel 25 carries a plurality of sets of corner mirrors, each consisting of a pair of confronting mirror members 26 and 27, for scanning the diffracted radiant energy spectrum from the mirror 23 and sequentially redirecting the spectral beams in a return pass through the instrument. The scanning wheel 25 is driven at a predetermined constant rotational speed by a motor M. The confronting mirror members 26, 27 of each corner mirror set are disposed perpendicular to each other and diverge away from each other toward the periphery of the wheel at opposite 45° angles to a radius R of the wheel passing through their corner intersection 28. In such a corner mirror member arrangement an incident beam striking the mirror 26 is reflected across to the mirror member 27 and from the mirror member 27 along a path parallel to but offset from the original path of the beam to the mirror member 26. For example, a beam from the reflecting mirror 23 striking mirror member 26 at the portion 26′ will be directed by the mirror member 26 to the portion 27′ of the mirror member 27 and reflected along a path parallel to but offset from the path of the incident beam from mirror 23.

Conversely a parallel beam striking the mirror member 27 at its portion 27′ will be reflected to the portion 26′ of the mirror member 26 and returned along a path parallel to but offset from the mirror member.

The corner-mirror scanning wheel 25 is mounted for rotation generally tangent to the focal plane 24. Assuming counterclockwise rotation in the figure, first the mirror member 26 moves across the focal plane 24 from right to left, and then the opposite mirror member 27 of the same pair moves across the focal plane 24 from right to left.

As the wheel rotates, the sets of corner mirrors will be moved through the focused beams from the mirror 23 to cause the beams of radiation from the corner mirrors to sequentially strike the portions 26′, 27′ of the corner mirrors. When the mirror member 26 or 27 receives incident radiation from the mirror 23 and reflects it to the other mirror member and back to the mirror 23, the beam will be redirected through the instrument along a predetermined return path which is offset from the path of the incoming beam from the entrance slit to the mirror 23 by a distance corresponding to the distance between the mirror portions 26′, 27′. For example, a beam x from the entrance slit is diffracted into component beams y and z. When the beam y is reflected by the mirror 23 to strike the mirror member 26 at the portion 26′ of the mirror member 26, it is returned to the mirror 23 by the portion 27′ of the mirror member 27 and will follow a path to the mirror 22 that is offset below its path to the mirror 23, while the component beam z from the mirror 23 striking the corner mirror portion 27′ will be redirected by the mirror member 26 to the mirror 23 and will return to mirror 22 along a path offset above the original path for the beam z. Exit slit mirrors 32, 33 are disposed in the return paths of the beams from the portions 26′, 27′ on the entrance side of the reflecting mirror 20 to intercept the displaced beams from the corner mirror portions 26′, 27′ and to direct these beams onto exit slits 34, 41.

In operation, the corner mirror member 26 of any set of corner mirrors first moves into the radiation reflected by the mirror 23 but radiation will not be returned through the instrument until the scanning wheel 25 has revolved to where the corner mirror member 27 is in position to redirect radiation from the mirror member 26 to the mirror 23 and to receive incident radiation from the mirror 23 and reflect it to the mirror member 26 to direct it in a return path through the instrument. Consequently, when the mirror member 26 is in a position where radiation from the center of the spectral band will strike the portion 26′ of the mirror member 26, the mirror member 27 is in a position where the radiation from the lower end of the band (shorter wavelength) strikes the portion 27′ of the corner mirror member 27 and as the wheel rotates, the corner mirror member 26 will sequentially intercept the progressively longer wavelength spectral component beams in the longer wavelength portion of the band while the corner mirror member 27 sequentially intercepts the progressively longer wavelength beams in the shorter wavelength portion of the band. Referring to the drawing, the corner mirror member 26 will sequentially intercept those beams which strike the mirror 23 from the center of the mirror to the left while the corner mirror member 27 at the same time is sequentially scanning the beams which strike the reflecting mirror 23 from the right to the center.

In the ideal practice, the corner mirrors 26, 27 would move linearly across the beams of component spectral radiation from the reflecting mirror 23. In actual practice, the corner mirrors may be mounted on a scanning wheel having, for example, a diameter of 12 inches and 24 pairs or sets of corner mirrors. The rotational speed may, for example, be 24 to 2400 revolutions per minute and in one embodiment the dispersed radiation may extend to about 50 millimeters from right to left at the focal plane 24 and the period of time for each scan by a pair of mirror members 26, 27 is from 100 milliseconds to 1 millisecond depending upon the rotational speed.

The scanning wheel, as shown in the drawing, has a disproportionately small radius and a small number of corner mirrors for clarity of illustration but without intending to suggest that these proportions be adopted in actual practice. By using a relatively large wheel and moving the corner mirrors generally tangentially to the focal plane, the movement of the corner mirrors is sufficiently linear so as to provide an approximately linear wavelength scale.

During operation, the corner mirrors will tend to redirect radiation through the instrument in addition to that striking the portions 26', 27'. An important feature of the invention is the provision of an apertured baffle 31 along the midplane of each set of corner mirrors. This aperture in the baffle has been designated by the numeral 31a and is of a size to allow the component spectral beams to be redirected through the instrument in sequence. In view of the fact that the movement of the corner mirrors is not precisely linear and that minor non-linearities may be present in the optical system, the aperture is preferably of a size larger than necessary to pass a single band of spectral radiation because it might otherwise block the redirection of the spectral beams. In practice, the apertured baffle may be sufficiently large to pass several spectral beams.

From the foregoing, it will be understood that the various wavelength components which were in the portion of the spectrum appearing at the focal plane 24 are reflected back to mirror 23 spaced apart in time according to the speed at which the corner mirror has scanned through the focal plane. These time-displaced different wavelength components are transmitted back through the optical system composed of the second collimator mirror 22, the grating 21 and the first collimator mirror 20. In this return pass of the radiant energy the grating 21 further disperses the radiant energy into its different wavelength components. After being dispersed the second time by the grating 21, the radiant energy is collimated by mirror 20, which causes the different wavelength components to be reflected along parallel paths (still displaced in time).

The pair of plane mirrors 32 and 33 are positioned on opposite sides laterally of the entrance slit 11 to intercept the return radiant energy reflected from mirror 20. Both of these mirrors 32, 33 are positioned at the same acute angle, preferably 45°, to the path of the return energy. Due to the symmetry of the corner mirror array on the scanning wheel 25, the shorter of the wavelength half of the scanned portion of the spectrum will return laterally displaced to one side of the entrance slit 11 so as to strike mirror 32, and the longer wavelength half will return laterally displaced to the opposite side of entrance slit 11 so as to strike mirror 33.

The shorter wavelength half of the scanned portion of the spectrum which is reflected from mirror 32 passes through a first exist slit 34 and filter 35 to a first photoelectric detector 36, which produces an electrical output signal whose instantaneous amplitude is proportional to the instantaneous intensity of the radiant energy which it receives. This output signal is amplified by an amplifier 36a and is applied via line 37 to a control circuit 38 and from there it is applied via line 39 to one set of vertical deflection plates in a dual-beam cathode ray oscilloscope 40.

The shorter length half of the scanned portion of the spectrum which is reflected from mirror 32, passes through a second exit slit 41 and filter 42 to a second photoelectric detector 43, which produces an electrical output signal whose instantaneous amplitude is proportional to the instantaneous intensity of the radiant energy which is receives. This second output signal is amplified by an amplifier 43a and is applied via line 44 to control circuit 38 and from there via line 45 to a second set of vertical deflection plates in the dual-beam oscilloscope 40.

Another important feature of the present invention is the novel arrangement therein for controlling the display of the radiant energy spectrum on the oscilloscope in response to the approach of each corner mirror to the focal plane where it scans the spectrum. In accordance with this feature of the invention, the horizontal sweep of each cathode ray beam in the oscilloscope 40 is initiated in response to the energization of a photoelectric detector 46, which is connected by a line 47 to the control circuit 38. Associated with this detector 46 is a light source 48 which directs a beam of light through a lens 49 to a stationary plane mirror 50, which presents a reflecting surface disposed at 45° to a radius R' of the scanning wheel passing through the corner 28 of the corner mirror 26, 27 immediately behind the corner mirror which is then scanning through the focal plane 24.

The arrangement is such that the light from this source 48 is reflected from the plane mirror 50 to one corner mirror member 26 through the apertured baffle 31 to the opposite mirror member 27 of the same pair, and from mirror member 27 back to mirror 50 and from the later through a lens 51 to the detected 46 when the corner mirror set is at a position corresponding to a predetermined time interval before that same corner mirror will begin to scan through the focal plane 24. A suitable time delay means is provided in the control circuit 38 to delay the start of the horizontal sweep of the cathode ray beams until that same corner mirror will have moved into position to begin scanning the radiant energy spectrum in focal plane 24. This time delay is, of course, correlated with the constant rotational speed of the scanning wheel at that time. The time delay means may comprise one or more one shot multivibrators triggered by the photocell 46 to an unstable state and providing a signal to trigger the horizontal sweep when on return to a stable state. Preferably the speed of the scanning wheel and the time delay is adjustable in any known manner to provide scans at different rates. With this arrangement, therefore, the triggering of the horizontal sweep of the cathode ray beam will always occur so that at the instant when a set of corner mirrors is positioned to start their scan the position of each horizontal sweep will always begin at a particular wavelength on the scan. The mounting of the corner mirrors on the scanning wheel is not critical because the pulse which triggers the horizontal sweep will always occur at a fixed time interval after the detector 46 has been energized, and such energization of detector 46 will always take place in response to the actual position of a corner mirror even if the corner mirrors are not precisely spaced apart on the scanning wheel.

With this arrangement, for each scan by a particular corner mirror 26, 27 on the scanning wheel the cathode ray oscilloscope 40 displays a pair of traces 52, 53 representing radiation intensity vs. wavelength for the different parts of the spectral region detected by the respective detectors 36 and 43.

The control circuit 38 for the cathode ray oscilloscope 40 may include a vertical separation indexer which causes the traces produced in response to successive scans by the scanning wheel 25 to be vertically displaced on the face of the oscilloscope. These separate, vertically displaced traces may be identified by timing markers on a separate oscilloscope (not shown) which displays the total radiation from the source 10 over a period of time encompassing the successive scans. For this purpose, a detector 54, sensitive to the entire portion of the spectrum under consideration, may be positioned in the focal plane of the Cassegrainian optical system and this detector may be conected to this separate oscilloscope to display the total radiation pattern over this time period.

The signal from the detector 54 may also be applied to a coincidence gate means to which the time delayed signal from the synchronizing detector 46 is applied to initiate a scan when a phenomena is present.

From the foregoing description it will be apparent that the present arrangement provides a presentation of radiation intensity vs. wavelength which is substantially linear with time because the wavelength dispersion obtained from the grating 21 is substantially linear, the scanning of the spectrum by the constant speed scanning wheel 25 is substantially linear with time, and the horizontal sweep of each cathode ray beam in the dual-beam oscilloscope is linear with time. The diffraction grating and other critical optical components in this apparatus are pre-aligned and remain stationary during scanning, with the only moving part being the constant speed scanning wheel 25. Also, the double passing of the grating (i.e., sending the radiation back through the monochromator a second time) produces a higher spectral resolving power.

What is claimed is:

1. On a spectral analysis instrument having means for collecting radiant energy from a source thereof, means for dispersing said collected radiant energy into a spectrum, and means for focusing said spectrum of radiant energy on a predetermined focal plane, the improvement which comprises:

a plurality of successive corner mirrors, each comprising a pair of confronting, perpendicularly disposed mirror members, means for moving said corner mirrors in succession across said focal plane with the mirror members of each pair positioned diverging away from each other toward the incoming radiant energy spectrum to scan the incoming radiant energy and return said energy back through said last-mentioned focusing means and said dispersing means, means coacting with each corner mirror to limit said return of radiant energy to the incoming radiant energy which is scanned substantially in said focal plane;

and means for detecting said returned radiant energy.

2. A spectral analysis instrument according to claim 1, and further comprising:

sensing means for sensing the approach of a corner mirror to intercept said spectrum of radiant energy coming into said focal plane and providing a signal related in time to the positioning of said corner mirror to return a preselected spectral component of the incoming radiant energy;

and means coupled to the outputs of said sensing means and said means for detecting the returned radiant energy and operative to display the radiant energy spectrum scanned by said corner mirror and to identify said spectral component marking the start of a scan in response to said signal.

3. A spectral analysis instrument according to claim 2, wherein said sensing means is responsive to light from said corner mirror as the latter approaches a position for starting the scan.

4. A spectral analysis instrument according to claim 3, wherein said sensing means comprises source means for directing light onto a first mirror member of each pair as it approaches a scan position, and means responsive to reflected light from the other mirror member of said pair when the incident light from said source means strikes a predetermined portion of said first mirror member.

5. In a spectral analysis instrument having means for collecting and focusing radiant energy from a source thereof, means for dispersing the focused radiant energy into a spectrum, and means for focusing said spectrum of radiant energy on a predetermined focal plane, the improvement which comprises:

a rotatable scanning wheel carrying a plurality of corner mirrors, each comprising a pair of confronting mirror members disposed perpendicular to each other and diverging away from each other toward the periphery of the wheel at opposite 45° angles to a radius of the wheel passing through the intersection of the planes of said mirror members, said scanning wheel being mounted for rotation generally tangent to said predetermined focal plane so as to cause each of said mirror members to scan through said spectrum of incoming radiant energy in said focal plane, intercepting the incoming radiant energy in said focal plane and reflecting the same to the other mirror member of the same pair to return back through said last-mentioned focusing means and said dispersing means, and an apertured baffle positioned between the mirror members of each pair to limit the reflection of radiant energy between said mirror members to the incoming radiant energy which is intercepted by predetermined portions of said mirrors;

and means for detecting the reflected radiant energy which is returned back through said last-mentioned focusing means and said dispersing means.

6. In a spectral analysis instrument having means for collecting and focusing radiant energy from a source thereof; and a grating monochromator having an entrance slit positioned to pass radiant energy from said first-mentioned means, a first collimating mirror positioned in the path of the radiant energy passing through said entrance slit, a diffraction grating positioned to receive the collimated radiant energy reflected from said first collimating mirror, and a second collimating mirror positioned to receive the dispersed radiant energy from said grating; the improvement which comprises:

a rotatable corner mirror scanning wheel positioned to receive the radiant energy reflected from said second collimating mirror and carrying a plurality of corner mirrors positioned in succession circumferentially of the scanning wheel, each corner mirror comprising a pair of confronting mirror members disposed perpendicular to each other and diverging away from each other toward the periphery of the wheel at opposite 45° angles to a radius of the wheel passing through the corner intersection of the planes of said mirror members, said scanning wheel being rotatable generally tangent to a focal plane of the radiant energy spectrum coming from said second collimating mirror so as to cause said corner mirrors to repetitively scan the spectrum of incoming radiant energy and to reflect the different wavelength components thereof back parallel to, and laterally spaced from, their incoming paths for a return pass in succession to said second collimating mirror, said grating, and said first collimating mirror, said scanning wheel having an apertured baffle located along said radius between the mirror members of each corner mirror for limiting the radiant energy which is reflected back for said return pass to the incoming energy which is intercepted substantially in said focal plane;

a pair of mirrors positioned respectively on opposite sides laterally of said entrance slit to intercept different portions of the radiant energy spectrum which is returned through said return pass;

and a pair of detectors positioned respectively to receive the radiant energy reflected from said last-mentioned mirrors.

7. A spectral analysis instrument according to claim 6, and further comprising a mirror positioned to reflect the radiant energy between said second collimating mirror and said scanning wheel.

8. A spectral analysis instrument according to claim 6, and further comprising a dual beam cathode ray oscilloscope coupled to said detectors to display radiation vs. wavelength traces of the radiation received by said detectors.

9. A spectral analysis instrument according to claim 8, and further comprising means for initiating the horizontal sweep of said oscilloscope traces in response to a predetermined instantaneous rotational position of the corresponding corner mirror on the scanning wheel, so that each successive trace begins at the same wavelength.

10. In a spectral analysis instrument having means for collecting radiant energy from a source thereof, means for dispersing said collected radiant energy into a spectrum, and means for focusing said spectrum of radiant energy on a predetermined focal plane, the improvement which comprises:
- a plurality of successive corner mirrors, each comprising a pair of confronting, perpendicularly disposed mirror members, means for moving said corner mirrors in succession across said focal plane with the mirror members of each pair positioned diverging away from each other toward the incoming radiant energy spectrum to scan the incoming radiant energy and return said energy back through said last-mentioned focusing means and said dispersing means, and means for aligning said instrument comprising an optical means comprising a light source conjugate with said source for projecting an image through said means for collecting radiant energy.

References Cited

UNITED STATES PATENTS

| | | |
|---|---|---|
| 2,630,736 | 3/1953 | Beitz. |
| 2,723,589 | 11/1955 | Bullock et al. |
| 2,868,063 | 1/1959 | Weiss. |
| 2,871,757 | 2/1959 | Walsh. |
| 2,922,331 | 1/1960 | Fastie et al. |

FOREIGN PATENTS

| | | |
|---|---|---|
| 599,550 | 3/1948 | Great Britain. |

RONALD L. WIBERT, Primary Examiner

F. L. EVANS, Assistant Examiner

U.S. Cl. X.R.

350—7; 356—96